(No Model.)
F. RHIND.
CENTRAL DRAFT LAMP.
No. 333,338. Patented Dec. 29, 1885.
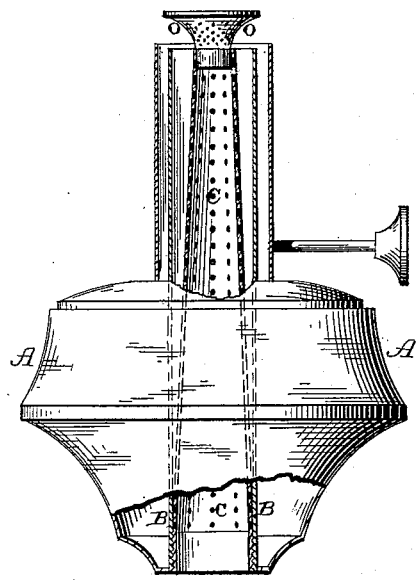
Witnesses.
L. F. Gardner
Jno. E. Prosperi
Inventor.
Frank Rhind,
per F. A. Lehmann,
Atty.

UNITED STATES PATENT OFFICE.

FRANK RHIND, OF BROOKLYN, ASSIGNOR OF ONE-HALF TO CHAS. S. UPTON, OF ROCHESTER, NEW YORK.

CENTRAL-DRAFT LAMP.

SPECIFICATION forming part of Letters Patent No. 333,338, dated December 29, 1885.

Application filed October 13, 1885. Serial No. 179,798. (No model.)

*To all whom it may concern:*

Be it known that I, FRANK RHIND, of Brooklyn, in the county of Kings and State of New York, have invented certain new and useful Improvements in Central-Draft Lamps; and I do hereby declare the following to be a full, clear, and exact description of the invention, such as will enable others skilled in the art to which it pertains to make and use it, reference being had to the accompanying drawing, which forms part of this specification.

My invention relates to an improvement in central-draft lamps; and it consists in the combination of the lamp-bowl, the central draft-tube placed therein, the perforated central supporting-tube, which is made large enough to snugly fit the draft-tube at its lower end, and the perforated spreader, placed upon the top of the support, all of which will be more fully described hereinafter.

The object of my invention is to make the spreader hollow, and to perforate it on its sides, so that the air can pass freely through it to the flame, and to cause all of the air which passes through the central draft-tube to pass through a perforated tube, which is placed therein, and thus both break up all of the currents and heat the air as it passes upward to the flame, thereby causing the flame to burn more steadily, and a more perfect combustion to take place.

Another object in causing all of the air to pass through the perforated tube is to cool the tube, so that the heat which it receives, both from the spreader and the flame, will not be conducted down to the lower part of the lamp-bowl.

The accompanying drawing represents a vertical section of a lamp which embodies my invention.

A represents the lamp-bowl, and B the ordinary central draft-tube placed therein. Inside of this tube B is placed the perforated adjustable tube C, which is made large enough at its lower end to fit snugly inside of the tube B, and thus prevent any air from passing up to the flame, except what passes directly through this tube C. This tube is preferably made conical, so as to make it as large as possible, and so that there will be abundant space left between the inner sides of the central draft-tube and the upper portion of the perforated tube for the air, which has passed through the tube C, to flow freely upward to the flame. The perforations in the tube serve to break up the currents of air, and thus prevent an unsteady flame being produced. As this tube becomes more or less heated, both from the flame and from the spreader on its top, the air in passing through the perforations becomes heated, and in abstracting the heat from this tube the heat is prevented from passing down the tube and heating the lower portion of the lamp-bowl. The tubes B C are made screw-threaded at their lower ends, so that the tube C can be adjusted vertically, and thus regulate the height of the spreader above the top of the wick-tube. When the spreader is raised upward, the flame is not spread or flattened out to such an extent as it is when the spreader is brought down nearer to the top of the wick-tube. Upon the top of this perforated conical tube is placed the hollow perforated spreader O, which is solid upon its top, perforated at its sides, and which is open at its lower end, so as to allow the air from the tube C to pass directly into it. The air, after passing into this perforated spreader, escapes from it in a highly-heated condition directly to the flame. All of the air which passes through the central tube, B, being highly heated by the time it reaches the flame, and there being no irregular currents of air, a most perfect combustion takes place, and a steady, even, white illuminating-flame is produced.

I am aware that a small perforated conical tube has been placed inside of the central draft-tube, and that a perforated spreader is also old, and these I disclaim. My invention differs from these in making the supporting-tube conical and perforated, and placing a perforated spreader upon its top, so that the tube serves to conduct heated air directly inside of the spreader.

Having thus described my invention, I claim—

In a central-draft lamp, the combination of the lamp-bowl, the central draft-tube, the conical perforated supporting-tube, the larger end of which snugly fits the interior of the draft-tube, and the hollow perforated spreader, which is placed upon the upper end of the supporting-tube and communicating therewith, substantially as set forth.

In testimony whereof I affix my signature in presence of three witnesses.

FRANK RHIND.

Witnesses:
RICHMOND BREWER,
HENRY N. BRIGHAM,
CHARLES S. UPTON.